United States Patent [19]
Beckingham

[11] Patent Number: 5,689,892
[45] Date of Patent: Nov. 25, 1997

[54] TWO-SPEED CONTINUOUS TANGENT SCREW

[75] Inventor: Michael Beckingham, Auckland, New Zealand

[73] Assignee: Trimble Navigation Limited, Sunnyvale, Calif.

[21] Appl. No.: 612,167

[22] Filed: Mar. 7, 1996

[51] Int. Cl.[6] .................................................. G01C 1/02
[52] U.S. Cl. .................. 33/292; 33/285; 33/1 N; 33/281
[58] Field of Search .................... 33/292, 1 M, 1 N, 33/1 PT, 281, 282, 285, 286, 290, 293

[56] References Cited

U.S. PATENT DOCUMENTS

| | | | |
|---|---|---|---|
| 2,667,693 | 2/1954 | Baker | 33/285 |
| 4,084,327 | 4/1978 | Kooi | 33/281 |
| 4,656,878 | 4/1987 | Iwai et al. | 33/285 |
| 4,752,126 | 6/1988 | Fujii | 33/285 |

FOREIGN PATENT DOCUMENTS

| | | | |
|---|---|---|---|
| 2229822 | 10/1990 | United Kingdom | 33/290 |

*Primary Examiner*—Christopher W. Fulton
*Attorney, Agent, or Firm*—Blakely, Sokoloff, Taylor & Zafman

[57] ABSTRACT

An adjustment mechanism for a telescope of a theodolite. The mechanism includes a worm gear that is coupled to a friction gear of the theodolite. The friction gear is coupled to the telescope so that any rotation of the gear will induce a corresponding movement of the scope. The worm gear is coupled to a linear screw and an outer sleeve. The linear screw has a shaft that can push the worm gear and rotate the friction gear to provide a fine movement of the telescope. The linear screw also has a stop that engages an arm of the sleeve. Continued rotation of the linear screw rotates the engaged sleeve and the worm gear to provide a coarse movement of the telescope. The linear screw is connected to a knob which can be rotated by an operator. The operator can induce a coarse movement of the telescope by turning the linear screw so that the stop engages the sleeve. The operator can induce a fine movement of the telescope by rotating the knob in a reverse direction so that the linear screw pushes the worm gear and rotates the friction gear.

14 Claims, 2 Drawing Sheets

TWO-SPEED CONTINUOUS TANGENT SCREW

BACKGROUND OF THE INVENTION

1. Field of the Invention

The present invention relates to an adjustment mechanism for moving the telescope of a theodolite.

2. Description of Related Art

Prior art theodolites and total stations typically contain a mechanism to provide coarse and fine movement of the telescope and locking mechanism that locks the telescope in position so that the coarse and fine mechanism can be used to move the telescope. Prior art theodolites and total stations therefore have two separate knobs on both the vertical and horizontal mechanisms that move the telescope in a vertical and horizontal direction. The locking mechanism locks a lever on the axis of the telescope and the coarse and fine mechanism operates against the end of this lever to move the telescope, the reverse direction of the lever, against the movement of the coarse and fine mechanism is typically achieved by a leaf or coil spring. The big problem with this type of mechanism is that the operator is continuously having to unlock and re-lock the locking mechanism in order to return the course and fine mechanism to the center of their run as their lateral movement is limited by the spring that acts against them. This is a great inconvenience to the operator as it takes up valuable time and it makes it almost impossible to track a moving target. It would be desirable to provide a theodolite or total station with a continuous coarse and fine adjusting mechanism for each of the vertical and horizontal alignment of the telescope, and that each mechanism should have only one knob that would move the telescope continuously.

SUMMARY OF THE INVENTION

The present invention is an adjustment mechanism for a telescope of an optical survey instrument. The mechanism includes a worm gear that is coupled to a friction gear of the theodolite. The friction gear is coupled to the telescope so that any rotation of the gear will induce a corresponding movement of the scope. The worm gear is coupled to a linear screw and an outer sleeve. The linear screw has a shaft that can push the worm gear and rotate the friction gear to provide a fine movement of the telescope. The linear screw also has a stop that engages an arm of the sleeve. Continued rotation of the linear screw rotates the engaged sleeve and the worm gear to provide a coarse movement of the telescope. The linear screw is connected to a knob which can be rotated by an operator. The operator can induce a coarse movement of the telescope by turning the linear screw so that the stop engages the sleeve. The operator can induce a fine movement of the telescope by rotating the knob in a reverse direction so that the linear screw pushes the worm gear and rotates the friction gear.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
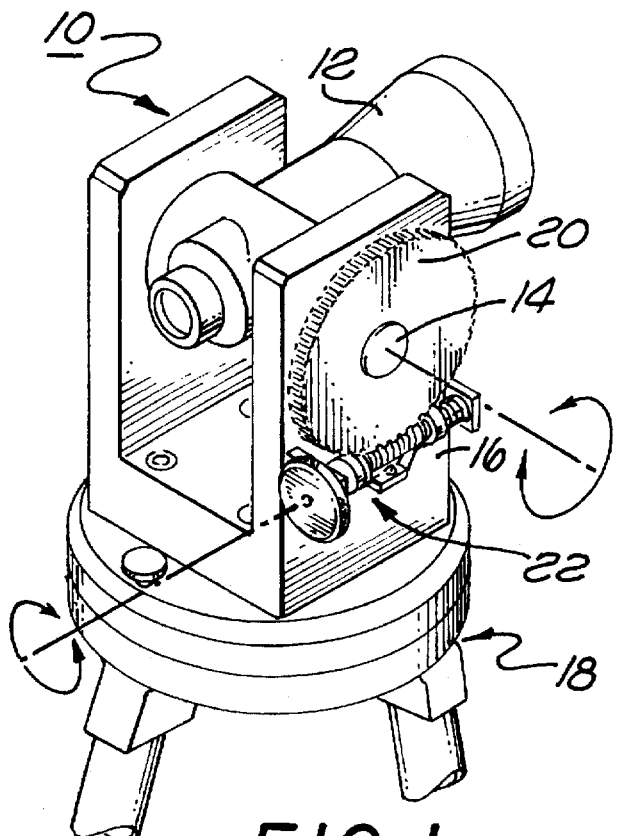
FIG. 1 is a perspective view of a theodolite of the present invention.

Referring to the drawings more particularly by reference numbers, FIGS. 1–4 show a theodolite 10 of the present invention. A theodolite 10 is a survey instrument that measures small vertical and horizontal angles. The theodolite 10 has a telescope 12 that is attached to a pivot pin 14. The pivot pin 14 is coupled to a base plate 16 that is mounted to a tripod stand 18. The pivot pin 14 is also attached to a friction gear 20.

The friction gear 20 is rotated by an adjustment mechanism 22. Rotation of the friction gear 20 will induce a corresponding rotational movement of the telescope 12 relative to the base plate 16 and tripod stand 18. The friction gear 20 provides a vertical movement of the telescope 12 so that the operator can align markings (not shown) in the scope with a marker (not shown). Although a vertical adjustment mechanism is shown and described, it is to be understood that a horizontal mechanism 22 can also be used to move the telescope 12 in a horizontal direction.

Figure 2:
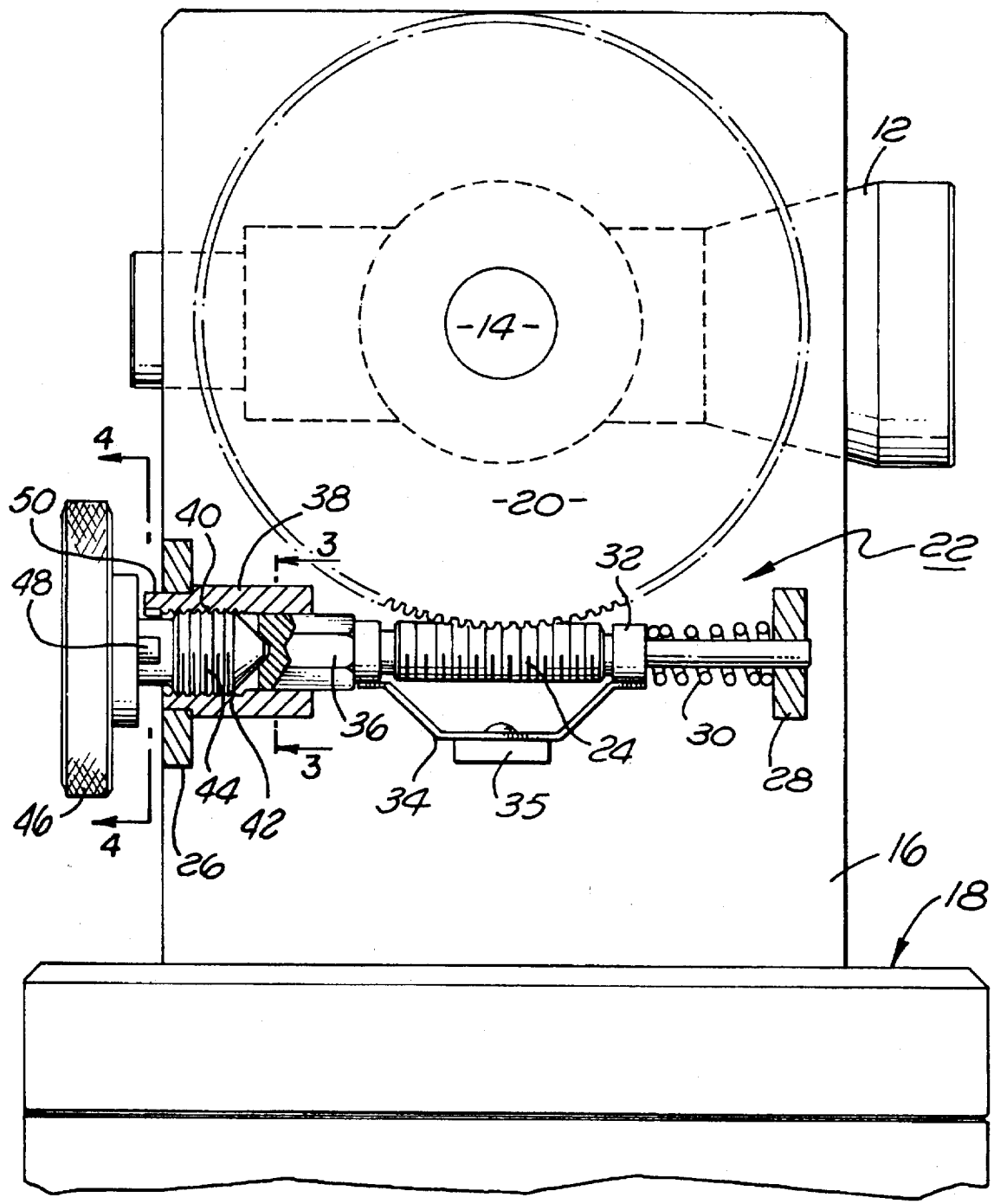
FIG. 2 is a side cross-sectional view of an adjustment mechanism of the theodolite.

As shown in FIG. 2, the adjustment mechanism 22 includes a worm gear 24 that is coupled to the friction gear 20. The worm gear 24 is supported by a pair of brackets 26 and 28 that are mounted to the base plate 16. The brackets 26 allow the worm gear 24 to rotate and translate relative to the base plate 16. The mechanism 22 includes a first spring 30 located between the bracket 26 and a collar 32 of the worm gear 16. The first spring 30 exerts a biasing force on the worm gear 24 along the longitudinal axis of the gear 24. The mechanism 22 may also contain a second spring 34 that is supported by bracket 35, and exerts a biasing force on the worm gear 24 that is essentially perpendicular to the longitudinal axis of the gear 24. The second spring 34 pushes the worm gear 24 into the friction gear 20 to insure engagement between the gears.

Figure 3:
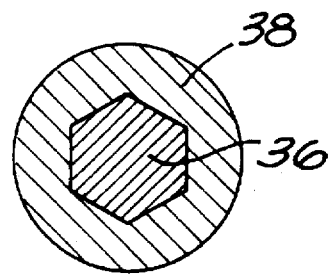
FIG. 3 is a cross-sectional view taken at line 3—3 of FIG. 2.

As shown in FIG. 3, the worm gear 24 has a hexagonally shaped end 36 that resides within a corresponding hexagonally shaped opening of an outer sleeve 38. The corresponding hexagonal features allow the worm gear 24 to move in a linear manner relative to the outer sleeve 38 while inducing a rotational movement of the gear 24 when the sleeve 38 is rotated.

Referring to FIG. 2, the outer sleeve 38 has internal threads 40 that cooperate with corresponding external threads 42 of a lead screw 44 so that the screw 44 can rotate relative to the sleeve 38. The end of the lead screw 44 engages and pushes the worm gear 24 when the screw 44 is rotated into the sleeve 38. The transitional movement of the worm gear 24 will induce a rotation of the friction gear 20 and a corresponding movement of the telescope 12. The threads 40 and 42 of the outer sleeve 38 and linear screw 44 have a relative high number of threads per inch so that a large rotation of the screw 44 will only induce a small rotation of the worm gear 24. In the preferred embodiment, the worm gear 24 will rotate 0.3° for each full revolution (360°) of the screw 24. The linear movement of the worm gear 24 provides a fine control of the telescope 12.

Figure 4:
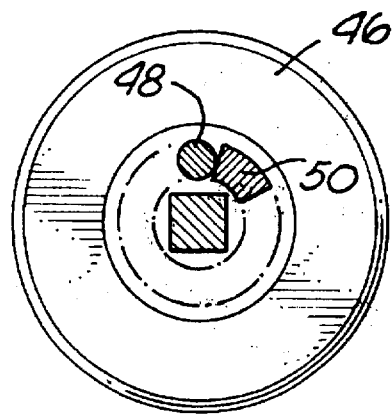
FIG. 4 is a cross-sectional view taken at line 4—4 of FIG. 2.

As shown in FIGS. 2 and 4, the linear screw 44 is attached to a knob 46. The knob 46 has a stop 48 that can engage an arm 50 of the outer sleeve 38 to move the sleeve 38 and rotate the worm gear 24. The rotation of the sleeve 38 and worm gear 24 provide a coarse movement of the telescope 12. In the preferred embodiment, the worm gear 24 will rotate 1.45° for each full revolution of the knob 46.

Figure 5:
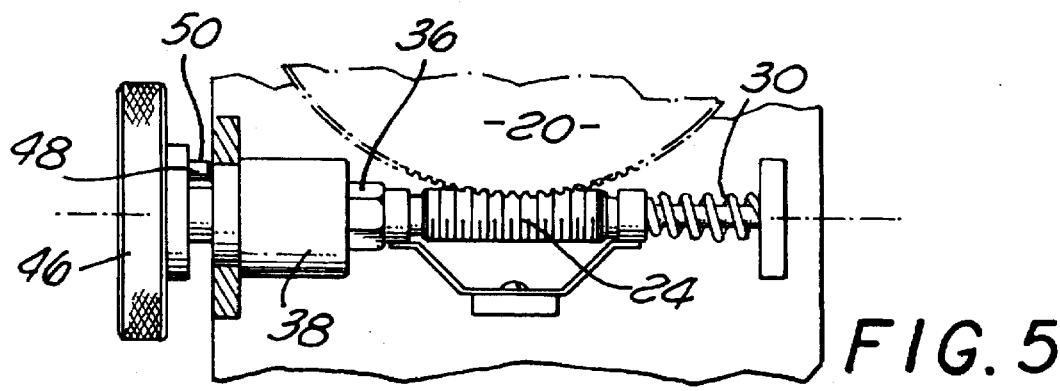
FIG. 5 is a side view of the adjustment mechanism showing a stop engaging an outer sleeve to induce a coarse movement of a telescope.

As shown in FIG. 5, in operation, the operator can adjust the theodolite 10 by turning the knob 46 until the stop 48 engages the arm 50 of the outer sleeve 38. Further rotation of the knob 46 will turn the sleeve 38 and rotate the worm gear 24. Rotation of the worm gear 24 turns the friction gear 20 and moves the telescope 12. The rotation of the sleeve 38 will provide a coarse adjustment of the telescope.

Figure 6:
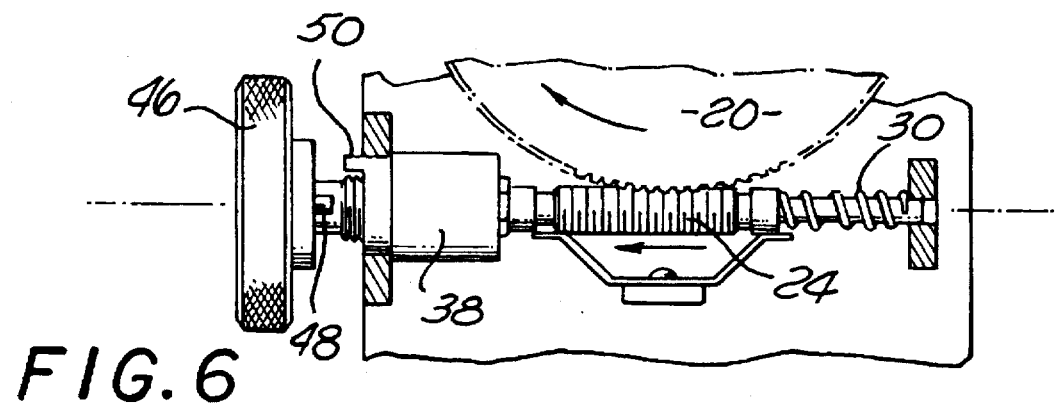
FIG. 6 is a side view similar to FIG. 5 showing the stop disengaged from the outer sleeve and a linear screw pushing a worm gear to induce a fine movement of the telescope.

As shown in FIG. 6, the operator can finely adjust the telescope 12 by rotating the knob 46 in the opposite direction. The opposite rotational movement of the knob 46 separates the stop 48 from the arm 50 and allows the linear screw 44 to screw into or out of the sleeve 38. If the linear screw 44 is screwed into the sleeve 38 the end of the screw 44 will push the worm gear 24 and rotate the friction gear 20. If the linear screw 44 is screwed out of the sleeve 38 the first spring 30 will push the worm gear 24 and rotate the friction gear 20. The operator can manipulate the knob 46 until the telescope 12 is properly aligned. The present invention provides a theodolite adjustment mechanism which allows the operator to coarsely and finely move a telescope with a single knob.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An adjustment mechanism for a theodolite which has a telescope that is coupled to a friction gear, comprising:

a worm gear coupled to the friction gear, wherein rotation or translation of said worm gear rotates the friction gear and moves the telescope;

a sleeve coupled to said worm gear; and, a lead screw that is coupled to said sleeve and said worm gear, said lead screw being rotated in a first direction to engage said sleeve and to rotate said sleeve, said worm gear and the friction gear, said lead screw also being rotated in a second opposite direction to translate said worm gear and rotate the friction gear.

2. The mechanism as recited in claim 1, further comprising a knob attached to said lead screw.

3. The mechanism as recited in claim 1, wherein said knob has a stop that engages an arm of said sleeve to rotate said sleeve.

4. The mechanism as recited in claim 1, further comprising a spring that exerts a biasing force along a longitudinal axis of said worm gear.

5. The mechanism as recited in claim 1, further comprising a spring that exerts a biasing force essentially perpendicular to a longitudinal axis of said worm gear.

6. The mechanism as recited in claim 5, further comprising a spring that exerts a biasing force essentially perpendicular to a longitudinal axis of said worm gear.

7. The mechanism as recited in claim 1, wherein the friction gear moves a first incremental movement in response to the rotation of said worm gear and a full revolution of said lead screw, and a second incremental movement in response to the translation of said worm gear and a full revolution of said lead screw, wherein the first incremental movement is greater than the second incremental movement.

8. A theodolite, comprising:

a stand;

a pivot pin coupled to said stand;

a telescope attached to said pivot pin;

a friction gear attached to said pivot pin;

a worm gear coupled to said friction gear, wherein rotation or translation of said worm gear rotates said friction gear and moves said telescope;

a sleeve coupled to said worm gear; and, a lead screw that is coupled to said sleeve and said worm gear, said lead screw being rotated in a first direction to engage said sleeve and to rotate said sleeve, said worm gear and said friction gear, said lead screw also being rotated in a second opposite direction to translate said worm gear and rotate said friction gear.

9. The mechanism as recited in claim 8, wherein said friction gear moves a first incremental movement in response to the rotation of said worm gear and a full revolution of said lead screw, and a second incremental movement in response to the translation of said worm gear and a full revolution of said lead screw, wherein the first incremental movement is greater than the second incremental movement.

10. The theodolite as recited in claim 9, further comprising a knob attached to said lead screw.

11. The theodolite as recited in claim 10, wherein said lead screw has a stop that engages an arm of said sleeve to rotate said sleeve.

12. The theodolite as recited in claim 11, further comprising a spring that exerts a biasing force along a longitudinal axis of said worm gear.

13. The theodolite as recited in claim 12, further comprising a spring that exerts a biasing force essentially perpendicular to a longitudinal axis of said worm gear.

14. A method for moving a telescope of a theodolite, comprising the steps of:

a) providing a friction gear that is coupled to a worm gear and the telescope;

b) rotating said worm gear to turn said friction gear and move the telescope; and, c) translating said worm gear to turn said friction gear and move the telescope.

* * * * *